United States Patent
Wang et al.

(10) Patent No.: US 6,698,940 B2
(45) Date of Patent: Mar. 2, 2004

(54) SINGLE MODE OPTICAL FIBER ASSEMBLY USING HEAT CURABLE ADHESIVE

(75) Inventors: Chungyung Wang, Tu-Chen (TW); HungLun Chang, Tu-Chen (TW); Hsiang-Jui Wang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 300 days.

(21) Appl. No.: 09/833,966

(22) Filed: Apr. 11, 2001

(65) Prior Publication Data

US 2002/0150355 A1 Oct. 17, 2002

(51) Int. Cl.[7] .................................. G02B 6/36
(52) U.S. Cl. .......................... 385/92; 385/80
(58) Field of Search ............... 385/92, 76, 80, 385/94

(56) References Cited

U.S. PATENT DOCUMENTS

| | | | |
|---|---|---|---|
| 4,969,702 A | * | 11/1990 | Anderson ................ 385/33 |
| 5,708,741 A | * | 1/1998 | DeVeau .................. 385/49 |
| 5,862,303 A | * | 1/1999 | Adar et al. ............. 392/472 |
| 6,496,624 B1 | * | 12/2002 | Hikita et al. ............ 385/50 |
| 2002/0061723 A1 | * | 5/2002 | Duescher ................ 451/527 |

* cited by examiner

*Primary Examiner*—Chandrika Prasad
(74) *Attorney, Agent, or Firm*—Wei Te Chung

(57) ABSTRACT

A method for assembling an optical assembly including a base member and a receptacle is disclosed. The base member retains a light source such as a laser diode therein, and has a first junction surface. The receptacle retains an optic fiber therein and has a second junction surface. The method includes the steps of: bringing the receptacle and the base member together with the junction surfaces engaging each other, adjusting the relative position between the base member and receptacle to obtain the best alignment therebetween, applying a heat curable adhesive between the junction surfaces, heating the adhesive by means of a heating device, the heating device having an annular portion surrounding the optical assembly proximate to the junction surfaces whereby the adhesive is cured to secure the base member and the receptacle together. The annular portion of the heating device includes a pipe forming a plurality of nozzles for directing streams of heated air toward the adhesive. Alternatively, the annular portion is an electric resistance wire connected to an external power supply to generate heat toward the adhesive.

17 Claims, 6 Drawing Sheets

SINGLE MODE OPTICAL FIBER ASSEMBLY USING HEAT CURABLE ADHESIVE

BACKGROUND OF THE INVENTION

1. Field of the Invention

The present invention generally relates to a method for assembling an optical assembly comprising parts requiring relatively precise positioning, and more specifically to a method for efficiently assembling an optical transceiver module used to receive and transmit optical signals.

2. Description of Related Art

In optical communication systems, it is very important of an optical assembly for receiving and transmitting optical signals, and converting electrical signals into corresponding optical signals, and vice verse in an optical transceiver module. The optical assembly comprises parts which need precise positional alignment. Thus the assembling is relatively difficult. Therefore, a variety of methods for assembling have been developed.

The optical assembly comprises a support member having a first junction surface, and a cap member having a second junction surface. One conventional way to make the assembly is to secure the cap member to the support member by applying a heat curable adhesive, such as heat curable epoxy, between the junction surfaces. To ensure proper alignment between the support member and the cap member, during the process of assembling, the cap member and the support member are held in an adjusting device with the first junction surface engaging the second junction surface. A positional adjustment is performed on the support member and/or the cap member to obtain the desired alignment. The heat curable adhesive is then applied to the junction surfaces.

The optical assembly is securely clamped by a clamping device, and then moved into a curing oven to cure the adhesive. The entire process is unduly complicated.

Furthermore, such a method is not suitable for single mode fiber transmission systems because the diameter of a single mode fiber is between 6 $\mu$m and 10 $\mu$m. A 0.5 $\mu$m relative displacement of assembled components may result in a poor transmission. While the clamped optical assembly is being moved into the curing oven, the assembly is vulnerable to impact or other unwanted force. This can result in relative displacement and thus poor alignment between components of the assembly. In addition, temperature gradient occurring during the curing process may cause non-uniform heating of the assembly. This can also result in displacement of components.

Another conventional method for assembling an optical assembly is disclosed in U.S. Pat. No. 4,969,702 (shown in FIG. 1). The optical assembly comprises a laser diode (LD) 12, a support member 14, a lens 16 and a cap member 18. The laser diode 12 is fixedly positioned in the support member 14 to generate light outputs at particular wavelengths. The lens 16 is positioned with respect to the laser diode 12. The cap member 18 has a through hole 22. An optical fiber 24 placed in a ferrule 26 is secured in the through hole 22. An ultraviolet curable (UV) epoxy is applied between the cap member 18 and the support member 14, with the optical fiber 24 in approximate alignment with the laser diode 12 and the lens 16. Thus light outputs of the laser diode 12 are coupled to the optical fiber 24 through the lens 16. The support member 14 and the cap member 18 are then placed in an adjusting device, for precise adjustment of the relative position of the cap member 18 and the support member 14. The assembly is then exposed to UV light to cure the epoxy. At least one of the components must be transparent, to ensure proper exposure of the epoxy to the UV light. Furthermore, the adjusting device must have a sophisticated design to ensure such proper exposure. Thus the material of the components and the design of the adjusting device are both restricted.

Still another conventional method for assembling an optical assembly is disclosed in U.S. Pat. No. 5,073,047 (shown in FIG. 2). The optical assembly comprises a light source 15, a holder 19, a housing 17 and a receptacle 1. The light source 15 is fixedly positioned in the holder 19. The holder 19 with the light source 15 therein and the housing 17 are solidly welded together by means of a laser beam 16. The housing 17 and the receptacle 1 are solidly welded together by means of a laser beam 18 after positional alignment. The components solidly welded by the laser beams 16, 18 must be made of metal, and a costly laser device must be used.

Yet another conventional method for assembling an optical assembly uses an instant glue in order to reduce costs. The method comprise the steps of placing a support member and a cap member in an adjusting device, operating the adjusting device to properly align the members, and applying an instant glue between the members. The instant glue solidifies quickly and joins the support member and the cap member together. However, the instant glue can solidify only when it contacts vapor. Since vapor concentration may vary from point to point in a three dimensional space, and since it is difficult to control vapor concentration, a non-uniform curing may occur. This can result in poor alignment between the two members.

In view of above-described drawbacks of the prior art, there is a great need to provide a method for efficiently and effectively assembling an optical assembly having parts requiring relatively precise orientations.

SUMMARY OF THE INVENTION

It is an object of the present invention to provide a method for efficiently and rapidly assembling an optical assembly having parts requiring relatively precise orientations.

In accordance with the present invention, a method for assembling an optical assembly comprising a base member having a first junction surface and a receptacle having a second junction surface is disclosed. The method comprises the steps of: providing a base member retaining a photoelectric component therein and having a first junction surface; providing a receptacle retaining an optical fiber therein and having a second junction surface; bringing the receptacle and the base member together so that the first and second junction surfaces engage each other; applying a heat curable adhesive between the junction surfaces; providing a heating device having a heat energy emitting part to surround the junction surfaces; and actuating the heating device to generate heat in the heat energy emitting part to heat and cure the heat curable adhesive, thereby securing the base member and the receptacle together. If desired, a cooling step may be performed after the heating step. The heating device may comprise an electric heating element, such as a resistance wire. Alternatively, the heating device may comprise piping for directing heated air streams toward the adhesive.

DETAILED DESCRIPTION OF THE PREFERRED EMBODIMENT

Figure 1:
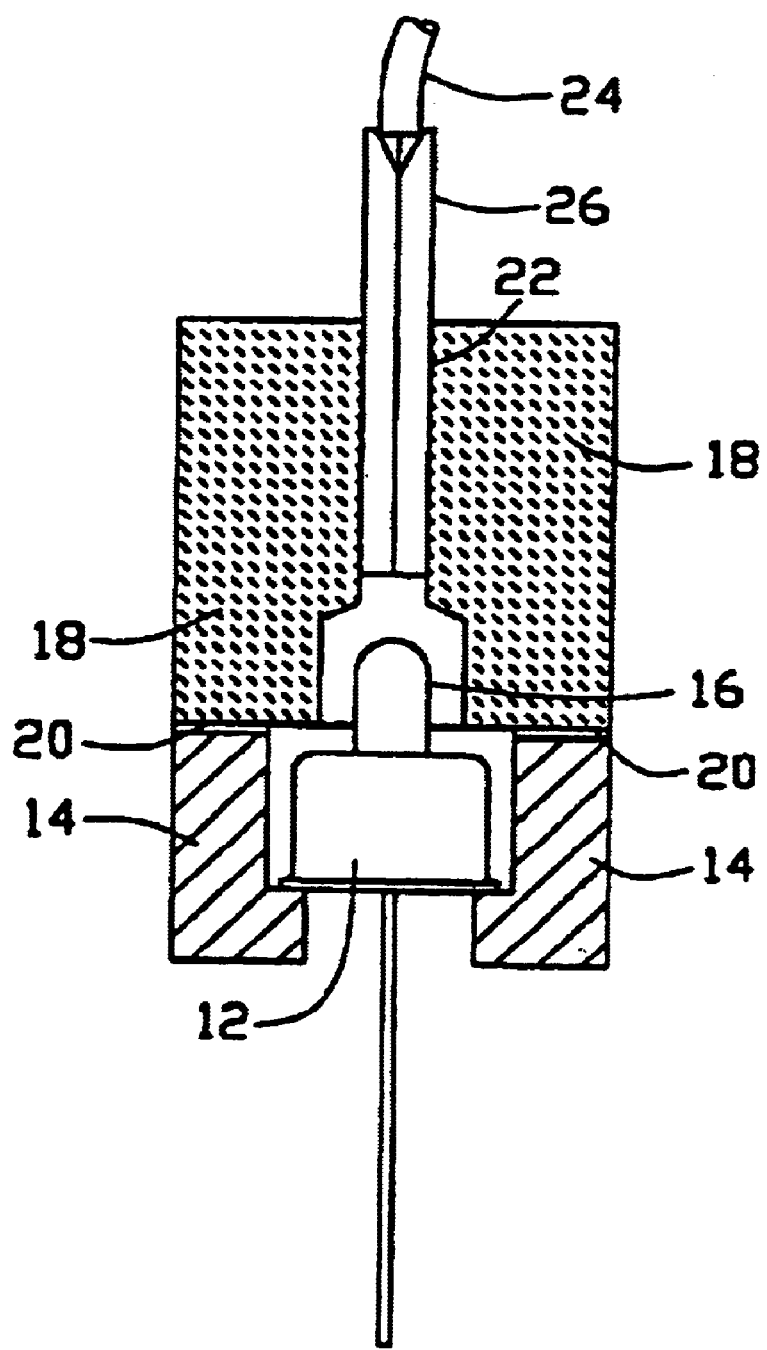
FIG. 1 is a cross-sectional view of a conventional optical assembly.
Figure 2:
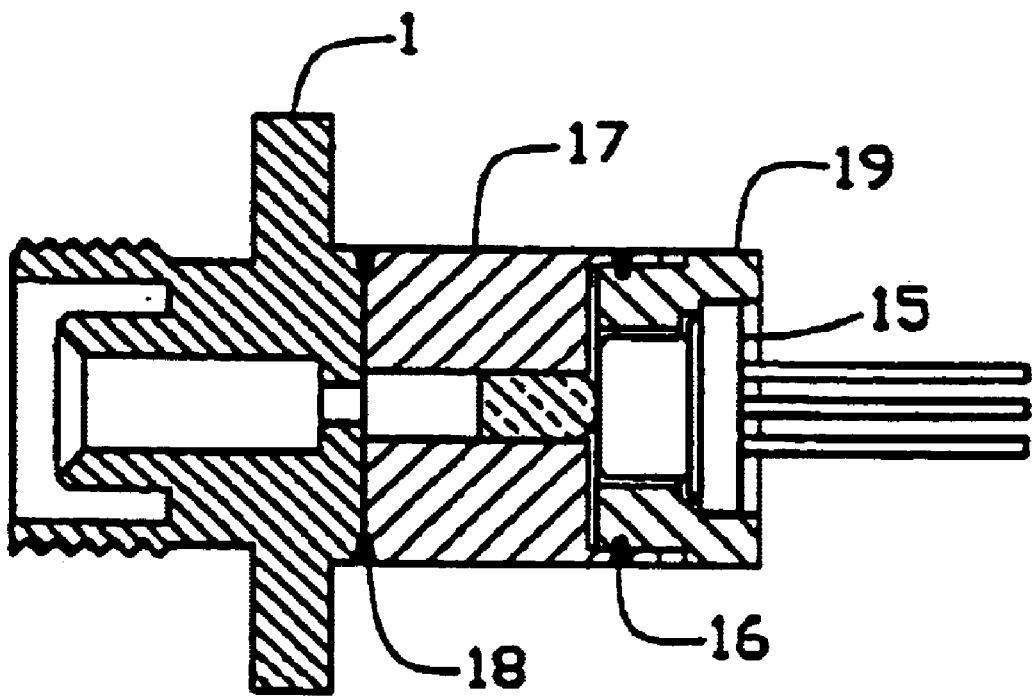
FIG. 2 is a cross-sectional view of another conventional optical assembly.
Figure 3:
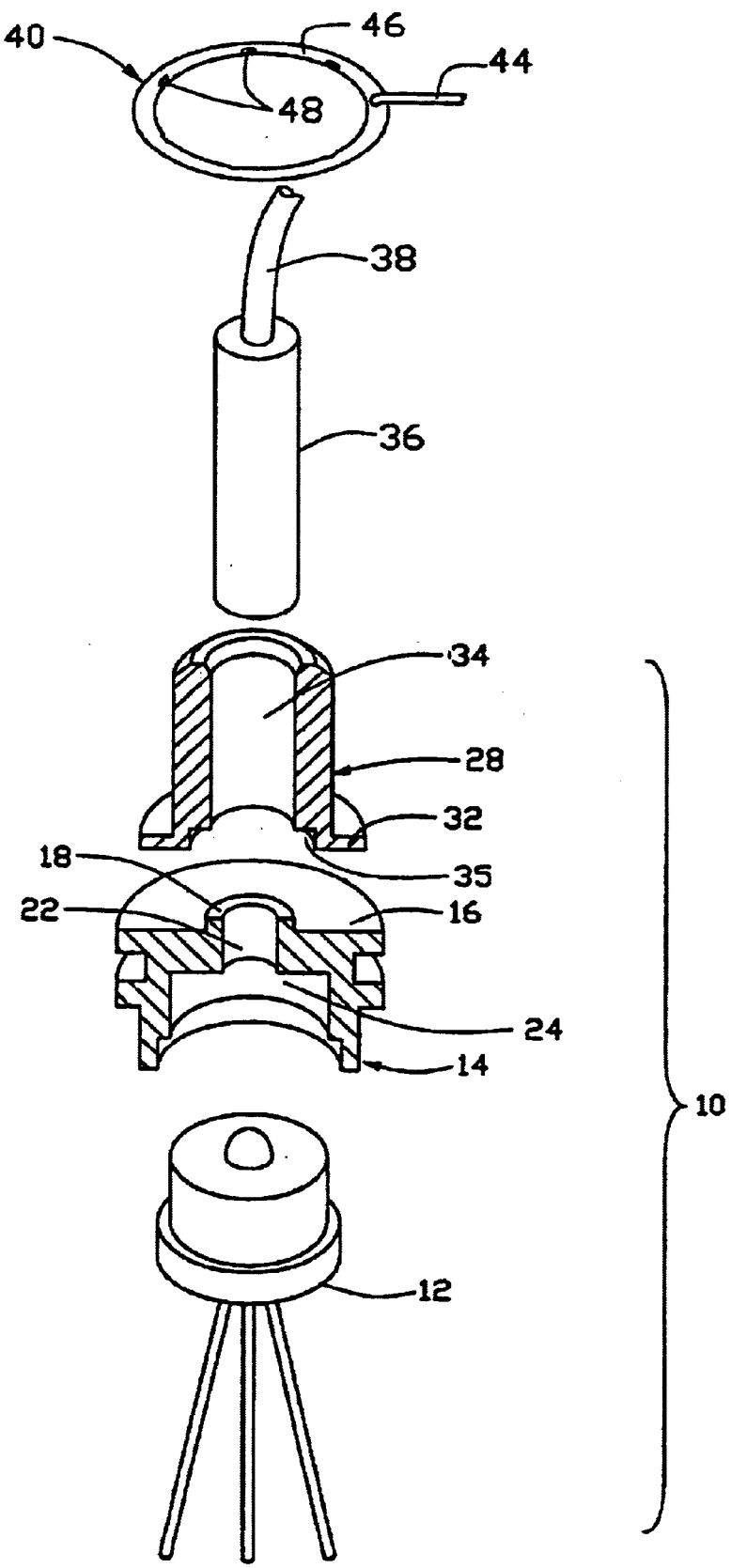
FIG. 3 is an exploded view of an optical assembly, a ferrule, an optical fiber and a heating device in accordance with a preferred embodiment of the present invention.
Figure 4:
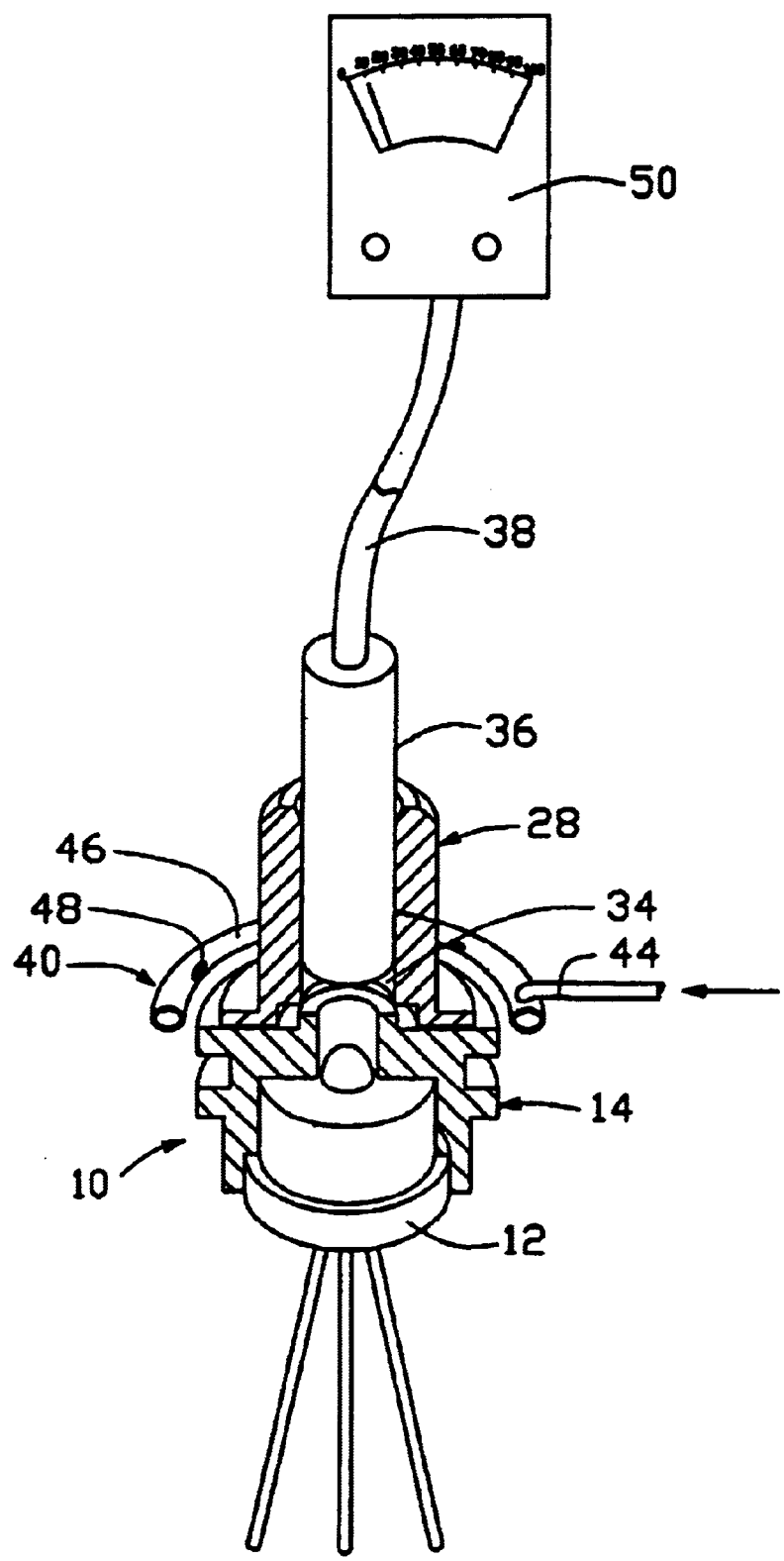
FIG. 4 is an assembled view of FIG. 3.

Referring to FIGS. 3 and 4, an optical assembly 10 comprises a light source 12 such as a laser diode (LD) or a light emitting diode (LED), a base member 14 and a receptacle 28. The light source 12 generates and outputs light at a particular wavelength, such as 1500 nm. The base member 14, which may be made of metal or plastic, defines a cavity 24 for receiving and retaining the light source 12 therein. The base member 14 also has a first junction surface 16, with a projection 18 formed on the surface 16. A through hole 22 is defined in the projection 18 in communication with the cavity 24, to allow the light to pass therethrough. Preferably, the hole 22 extends in a direction substantially normal to the first junction surface 16.

The receptacle 28 which can be made of metal or plastic has a second junction surface 32 to be positioned on and thus contact the first junction surface 16 during assembling. The receptacle 28 defines a channel 34 substantially co-axial with the hole 22. Preferably, the channel 34 extends in a direction substantially normal to the second junction surface 32. The channel 34 has an expanded end section 35 for accommodating the projection 18 of the base member 14. A ferrule 36 with an optical fiber 38 retained therein is inserted into the channel 34 for receiving and passing the light generated by the light source 12.

A heating device 40 comprises a supply pipe 44 connected to a source of heated air and an annular pipe 46 in fluid communication with the supply pipe 44. A plurality of nozzles 48 are formed on the annular pipe 46, facing radially inwardly. Air flow at a particular temperature is supplied from the supply pipe 44 into the annular pipe 46. The air is directed by the nozzles 48 toward the first and second junction surfaces 16, 32.

To assemble, the ferrule 36 with the optical fiber 38 retained therein is inserted into the channel 34 of the receptacle 28. An optical power metering device 50 is coupled to a free end of the optical fiber 38. The base member 14 and the receptacle 28 are brought together with the first and second junction surfaces 16, 32 engaging each other. The relative position of the receptacle 28 and the base member 14 is adjusted so that a maximum reading is obtained in the metering device 50.

A heat curable adhesive, such as a heat cured epoxy, is applied between the junction surfaces 16, 32 of the base member 14 and the receptacle 28 respectively. The heating device 40 is positioned to surround the optical assembly 10, with the nozzles 48 of the annular pipe 46 substantially aligned with the interface of the junction surfaces 16, 32. Heated air is then supplied from the supply pipe 44 to the annular pipe 46 and guided toward the junction surfaces 16, 32 by the nozzles 48.

If desired, after the adhesive is cured by the heated air, air flow having a lower temperature is supplied into the annular pipe 46 of the heating device 40. The lower temperature air flow is directed toward the optical assembly through the nozzles 48 to help cooling.

It is apparent to those skilled in the art that the light source 12 can be replaced with an optical detector such as PIN or APD. This converts an optical transmitter into an optical receiver. An AC voltmeter is connected to the optical detector during a process of aligning, for determining the best relative position between the base member 14 and the receptacle 28. When the AC voltmeter attains a maximum reading, a heat curable adhesive is applied between the junction surfaces 16, 32 and cured by the heated air flow, thereby securing the base member 14 and the receptacle 28 together in perfect alignment.

Figure 5:
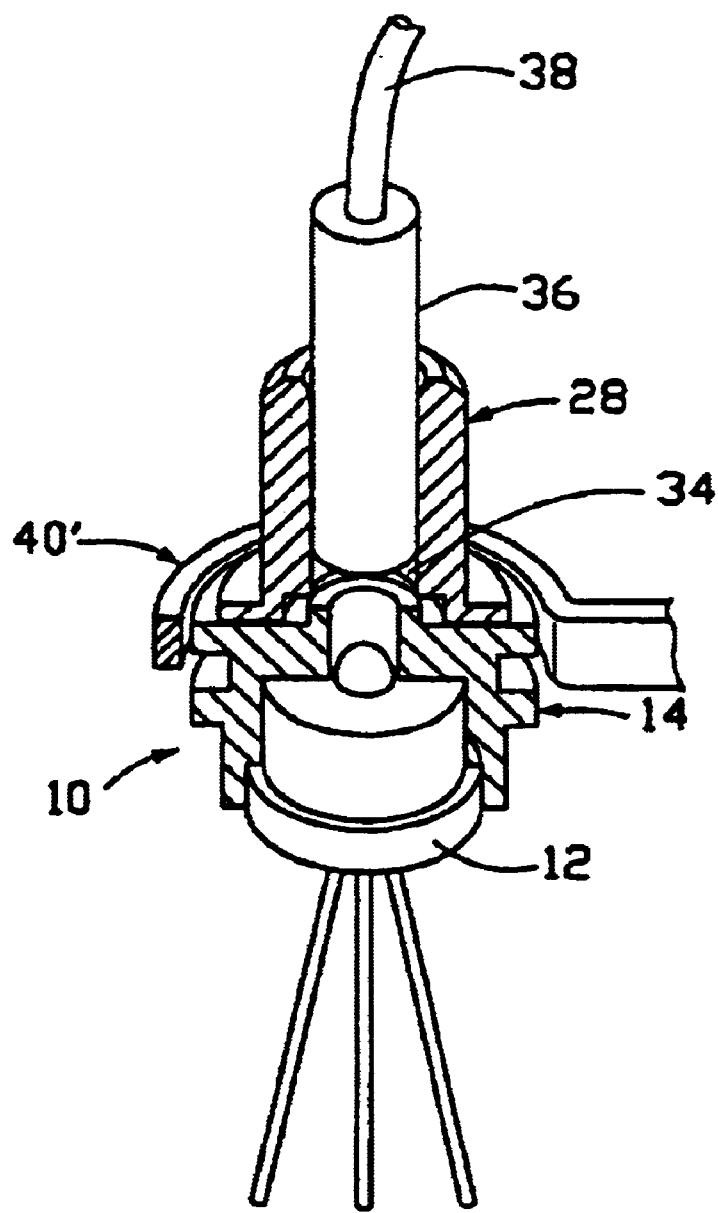
FIG. 5 is similar to FIG. 4, but showing a heating device in accordance with an alternative embodiment of the present invention.

FIG. 5 shows an alternative embodiment of the heating device which is designated with reference numeral 40' for distinction. The heating device 40' comprises a resistance wire or the likes. The resistance wire surrounds the optical assembly proximate to the junction surfaces 16, 32. A heat curable adhesive is applied between the junction surfaces 16, 32. The heating device 40' is actuated, whereby heat radiates from the resistance wire to cure the heat curable adhesive.

Figure 6:
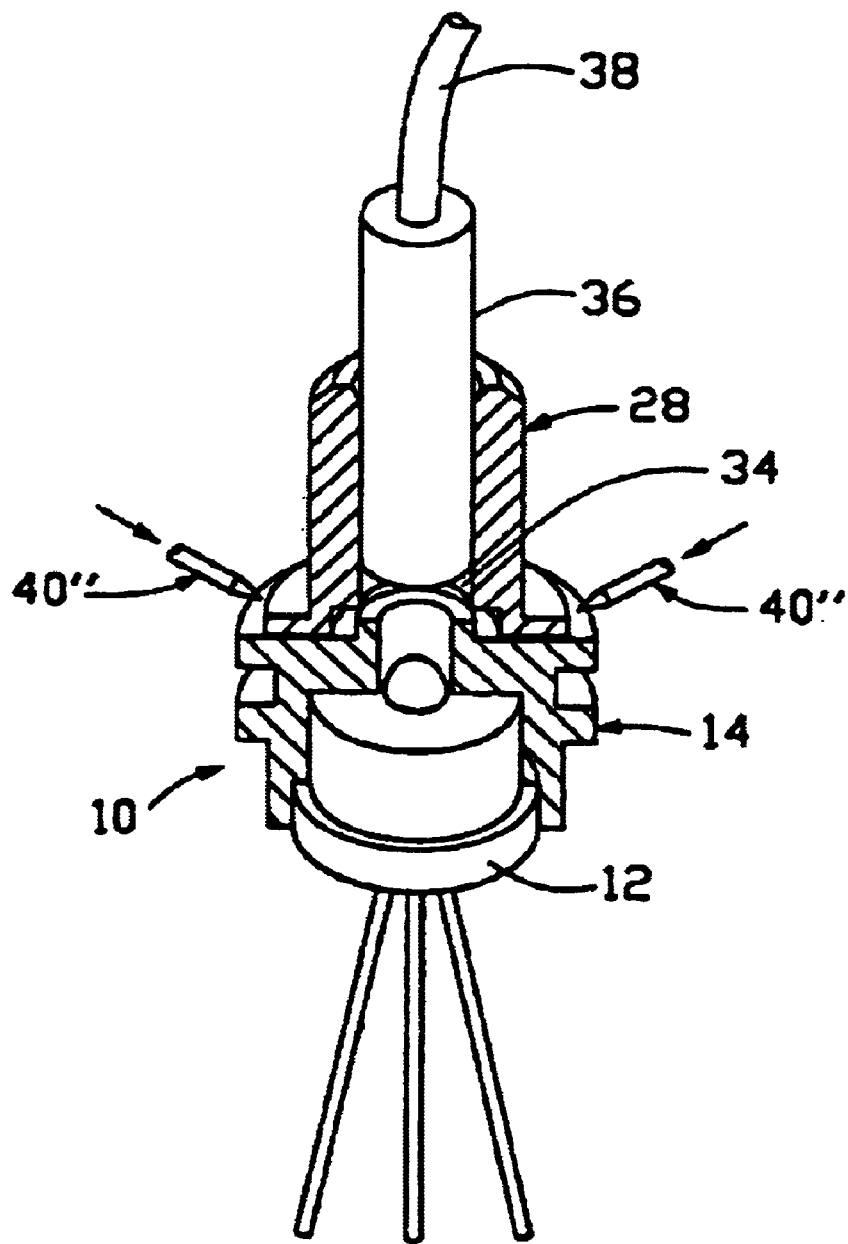
FIG. 6 is similar to FIG. 4, but showing a heating device in accordance with a further alternative embodiment of the present invention.

FIG. 6 shows a further alternative embodiment of the heating device, which is designated with reference numeral 40" for distinction. The heating device 40" comprises a plurality of independent air nozzles proximate to the junction surfaces 16, 32. The nozzles direct streams of heated air, thereby curing the heat curable adhesive between the base member 14 and the receptacle 28.

While preferred embodiments in accordance with the present invention have been shown and described, equivalent modifications and changes known to persons skilled in the art according to the spirit of the present invention are considered within the scope of the present invention as defined in the appended claims.

What is claimed is:

1. A method for assembling an optical device, comprising the steps of:

providing a base member with a photoelectric component retained therein, the base member having a first junction surface;

providing a receptacle retaining a first end of an optical fiber therein, the receptacle having a second junction surface;

bringing the receptacle and the base member together such that the first and second junction surfaces engage each other;

applying a heat curable adhesive between the first and second junction surfaces;

providing a heating device having a plurality of nozzles for directing streams of heated air toward the junction surfaces surrounding the first and second junction surfaces; and actuating the heating device to generate heat in the plurality of nozzles to heat and cure the heat curable adhesive and thereby secure the base member and the receptacle together.

2. The method of claim 1, wherein the plurality of nozzles is formed on an annular pipe.

3. The method of claim 2, wherein the heating device further comprises a supply pipe connected to and in fluid communication with the annular pipe for supplying air flow into the annular pipe.

4. The method of claim 1, wherein the plurality of nozzles independently directs air streams toward the junction surfaces.

5. The method of claim 1, wherein the photoelectric component comprises a light source.

6. The method of claim 1, wherein the photoelectric component comprises an optical detector.

7. The method of claim 1, further comprising a step of adjusting the relative position between the base member and the receptacle before applying the heat curable adhesive.

8. The method of claim 1, further comprising steps of mounting a power metering device to a second end of the optical fiber and adjusting the relative position between the base member and the receptacle to obtain a maximum reading of the power metering device before applying the heat curable adhesive.

9. The method of claim 1, further comprising a step of cooling the heat curable adhesive after the heat curable adhesive is heat-cured.

10. The method of claim 1, wherein the air streams have a first predetermined temperature.

11. The method of claim 10, further comprising the step of supplying air streams of a second predetermined temperature to cool the heat curable adhesive after the heat curable adhesive has cured.

12. A single mode optical fiber assembly, comprising:

a base member retaining a photoelectric component and having a first junction surface;

a receptacle retaining an optical fiber therein and having a second junction surface; and a heat curable adhesive between the junction surfaces of the base member and the receptacle;

wherein the heat curable adhesive is cured by applying heat thereto, thereby securing the base member and the receptacle together.

13. The single mode optical fiber assembly of claim 12, wherein a projection is formed on the first junction surface of the base member.

14. The single mode optical fiber assembly of claim 13, wherein the base member defines a through hole extending in a direction substantially normal to the first junction surface and through the projection to allow optical signals transmitted between the optic fiber and the photoelectric component.

15. The single made optical fiber assembly of claim 12, wherein the photoelectric component comprises a light source.

16. The single mode optical fiber assembly of claim 12, wherein the photoelectric component comprises an optical detector.

17. A method for assembling an optical device comprising the steps of:

providing a base with a first junction surface;

providing a receptacle with a second junction surface;

attached said base and receptacle together with the first junction surface and the second junction surface abutting against each other, in an axial direction, with a heat curable adhesive therebetween;

providing a heating device slightly radially spatially encircling said first and second junction surfaces and the adhesive therebetween; and actuating the heating device to disperse generated heat evenly and circumferentially around the first and second junction surfaces for securing the base and the receptacle together.

* * * * *